(No Model.)
C. H. RUSSOM.
MICROMETER GAGE.
No. 397,442. Patented Feb. 5, 1889.
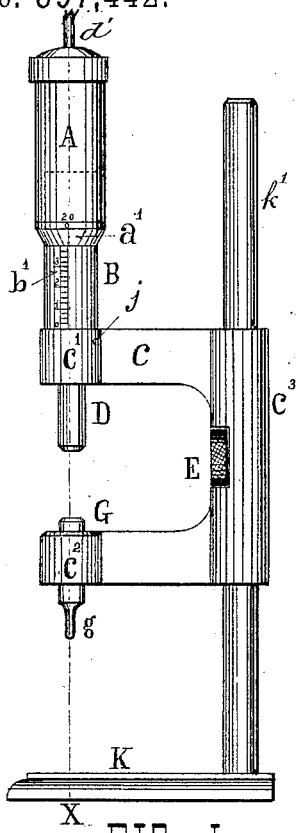
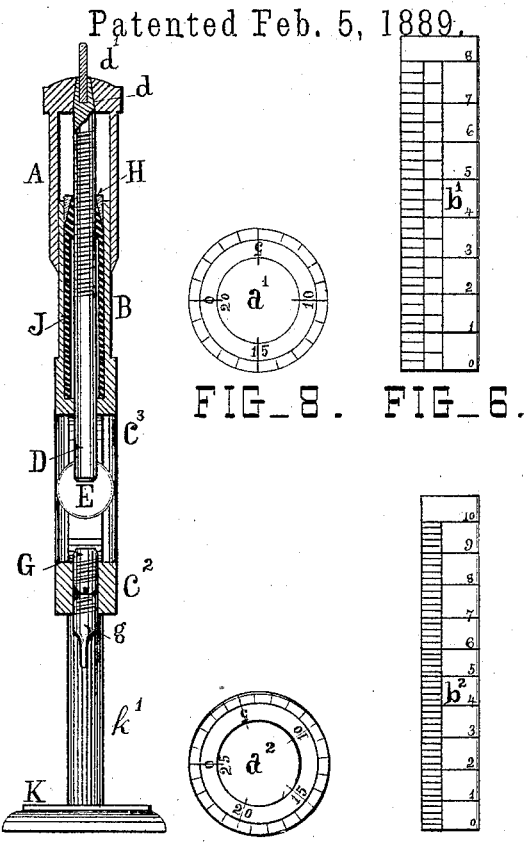
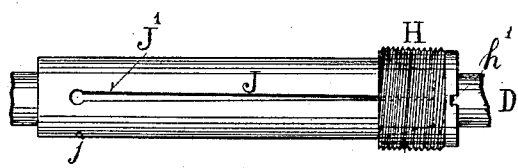
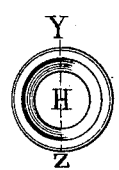
WITNESSES.
Will A Southwick.
Joe C. Hall.
INVENTOR.
Charles H. Russom
by N. DuBois, his atty.

UNITED STATES PATENT OFFICE.

CHARLES H. RUSSOM, OF SPRINGFIELD, ILLINOIS.

MICROMETER-GAGE.

SPECIFICATION forming part of Letters Patent No. 397,442, dated February 5, 1889.

Application filed June 25, 1888. Serial No. 273,199. (No model.)

*To all whom it may concern:*

Be it known that I, CHARLES H. RUSSOM, a citizen of the United States, residing at the city of Springfield, in the county of Sangamon and State of Illinois, have invented a new and useful Micrometer, of which the following is a specification.

My invention relates to improvements in micrometers or instruments for measuring small distances.

The purposes of my invention are, first, to provide a micrometer adapted to measure the fractional parts of an inch divided on the scale of the ordinary carpenter's rule, to wit, one-half, one-quarter, one-eighth, one-sixteenth of an inch, and so on to one sixty-fourth of an inch, also one-tenth part of one-sixty-fourth of an inch; second, to provide an improved adjustable nut inclosing the micrometer-screw, and through which said screw works; third, to provide a conical screw-thimble of improved construction for clamping the adjustable nut against the micrometer-screw; fourth, to securely inclose the working parts of the micrometer to protect them from injury; fifth, to provide an improved means for attaching the micrometer-screw to the outer shell of the micrometer, thus attaining more perfect alignment of the parts; sixth, to provide a convenient and effective means for clamping the micrometer to the micrometer-stand when used as a surface-gage, &c. These objects I attain by the mechanism illustrated in the accompanying drawings, in which—

Figure 1 is a side view of the micrometer and stand. Fig. 2 is a vertical section on the line W X. Fig. 3 is an enlarged view of the adjustable nut, showing the conical screw-thimble in position. Fig. 4 is a view of the lower end of the conical screw-thimble. Fig. 5 is a section through the screw-thimble on line Y Z. Figs. 6 and 7 are plans of the vertical scales on the tube B. Figs. 8 and 9 are plans of the horizontal scales used on the lower edge of the shell A. Figs. 3 to 9, inclusive, are on an enlarged scale.

A is the shell of the micrometer, in the upper end of which there is a tapering hole, $d$, into which is forced the tapering upper end of the micrometer-screw D. The end of the screw fitting tightly in the tapering hole is of obvious advantage in securing the screw in a vertical position, because the tapered surface holds the shell A true to the axis of the screw, and in fitting the parts a slight variation in the size of the hole would not make a misfit, as would be the case if only a straight hole and a straight shoulder were used.

C is the micrometer-frame, the rear end, $c^3$, of which is cylindrical in form and pierced by a suitable hole to receive the vertical rod $k'$ of a supporting-stand, K. The front ends of both the upper and lower arms of the frame C are also cylindrical in form, as clearly shown at $c'$ and $c^2$. The upper arm, $c'$, supports and is integral with the cylindrical extension or tube B. The tube B slides for a part of its length within the outer shell, A.

The threaded part of the micrometer-screw D, the adjustable nut J, and the conical adjusting-screw H are all within the shell A and the tube B, being thereby well protected from injury by dust or grit, since there are no lateral openings either in the shell A or the tube B. This is a valuable feature of my invention. The cylindrical end $c^2$ of the lower arm of the frame C incloses the adjusting-screws G and $g$, shown and described (as also is the stand for the micrometer) in my patent for improvement in micrometers, No. 305,337, dated September 16, 1884, to which reference is hereby made.

J is an expansible or adjustable nut, having on opposite sides longitudinal slits and connected by means of the pin $j$ within the tube B and surrounding the screw D, and the screw D works in the nut J. The lower end of the nut J rests on the bottom of the tube B.

H is a conical adjusting-screw, the outer surface of which is cylindrical and threaded to screw inside of the tube B, while its inner surface is conical and fits over the tapering end of the expansible adjusting-nut J, so that as the screw H is turned downward it compresses the sides of the expansible nut J, thereby adjusting said nut to the micrometer-screw D and taking up the wear of the parts.

E is a clamping-screw passing horizontally through the rear part of the frame C, so that the end of the screw will press against the supporting-rod $k'$ of the stand K. The head of the clamping-screw E being flush with the edge of the frame C is not in the way of articles inserted for measurement, while its projecting sides are in very convenient position for use. The conical adjusting-screw H has notches in its upper edge to receive a suitable key by which said screw may be turned. The adjusting-pin $d'$ screws into the top of the screw D. This pin serves as one of the bearing-points when my micrometer is used as an internal calipers—as, for example, in measuring the inside diameter of a hollow cylinder; and the pin $d'$ is screwed into the screw D, so that the pin $d'$ may be readily removable in case of injury, so, also, that longer or shorter pins may be used, as may be desired, thus increasing the scope of the measurements.

In measuring distances of one-half, one-fourth, one-eighth, one-sixteenth, one thirty-second, &c., of an inch I use a micrometer-screw having thirty-two threads to the inch, so that each turn of said screw will measure on the vertical scale $b'$ one one-thirty-second of an inch. The vertical scale $b'$, Fig. 6, is divided into eight equal parts, and each of these parts is subdivided into four equal parts, each of said subdivisions being one thirty-second of an inch in length. The horizontal scale $a'$, Fig. 8, is divided into twenty equal parts, so that when the screw D is turned one-half around the horizontal scale will indicate ten-twentieths or one-half of a turn of said screw, equal to one sixty-fourth of an inch. Hence each small subdivision on the horizontal scale will measure one-tenth of one sixty-fourth of an inch, so that readings of the scale may be made to decimal parts of one sixty-fourth of an inch.

By using a micrometer-screw with forty threads to the inch and a vertical scale, $b^2$, in connection with a horizontal scale, $a^2$, having twenty-five equal subdivisions, my improvement may be adapted to measure distances on a decimal scale from one one-thousandth of an inch to one inch.

In connection with the stand K my device may be used for all the purposes specified in my patent, No. 305,337, of September 16, 1884. I know that micrometers have been made having a slotted adjusting-nut integral with the micrometer-frame. The practical objection to these as heretofore constructed is that injury to said nut spoils the micrometer, since the nut cannot be readily repaired or replaced. My improvement obviates this objection. I also know that micrometers have been made in which the adjusting-nut is integral with the tube and detachable from the U-shaped frame; but in these the tube is slotted and admits dust and grit, to the injury of the micrometer-screw. This objection is entirely overcome in my improvement.

Operation: The operation of my device is as follows: The micrometer-screw is turned to a height sufficient to admit the article to be measured between the bottom of the screw D and the top of the adjusting-screw G. The micrometer-screw is then turned downward until it bears evenly upon the article lying on top of the adjusting-screw G. The distance indicated by the vertical scale $b'$ is noted, also the number of divisions that the 0 point on the horizontal scale $a'$ has passed beyond the vertical line of the scale $b'$. For example, assume that the end of the screw D is distant from the top of the screw G two and one-half turns, then the reading would be on the vertical scale two subdivisions equal to one-sixteenth of an inch, and on the horizontal scale ten subdivisions equal to one sixty-fourth of an inch, making the complete reading five sixty-fourths of an inch. If then the screw be turned up until the horizontal scale marks one additional subdivision, the reading would be five sixty-fourths of an inch plus one-tenth of a sixty-fourth, and so on.

What I claim as new, and desire to secure by Letters Patent, is—

1. An expansible adjusting-nut for micrometers, lying wholly within the micrometer-tube, having its upper end tapered and in its opposite sides longitudinal slits, substantially as shown and described, and for the purpose stated.

2. The combination, in a micrometer, of the micrometer-screw having its upper end tapered and fitting into a corresponding tapering hole in the top of the outer shell, with the tube sliding within said shell and the micrometer-frame, substantially as shown and described, and for the purpose stated.

3. The combination, in a micrometer, of an independent slotted expansible adjusting-nut and a conical screw-thimble, with the shell, the tube, the frame, and the micrometer-screw, substantially as shown and described, and for the purpose stated.

CHARLES H. RUSSOM.

Witnesses:
DAN. O'D. HALLAHAN,
HENRY KLAHOLT.